United States Patent [19]

Matono et al.

[11] Patent Number: 5,739,991
[45] Date of Patent: Apr. 14, 1998

[54] COMPOSITE THIN FILM HEAD HAVING MAGNETORESISTIVE AND INDUCTIVE HEAD PORTIONS WITH NONMAGNETIC THIN FILM INTERPOSED BETWEEN CORE AND SHIELD PORTIONS OF CORE LAYER

[75] Inventors: Naoto Matono, Kadoma; Shinji Kobayashi, Daito; Masahiro Nakata, Osaka, all of Japan

[73] Assignee: Sanyo Electric Co., Ltd., Osaka, Japan

[21] Appl. No.: 761,933

[22] Filed: Dec. 9, 1996

Related U.S. Application Data

[63] Continuation of Ser. No. 380,995, Jan. 31, 1995, abandoned.

[30] Foreign Application Priority Data

| Feb. 1, 1994 | [JP] | Japan | 6-010495 |
| Oct. 28, 1994 | [JP] | Japan | 6-265650 |

[51] Int. Cl.$^6$ ............................. G11B 5/39; G11B 5/147
[52] U.S. Cl. ......................................... 360/113; 360/126
[58] Field of Search ................................. 360/113, 126, 360/121, 122, 125, 128, 129

[56] References Cited

U.S. PATENT DOCUMENTS

| 3,975,772 | 8/1976 | Lin | 360/113 |
| 4,799,118 | 1/1989 | Yamada et al. | 360/122 |
| 5,168,409 | 12/1992 | Koyama et al. | 360/113 |
| 5,287,237 | 2/1994 | Kitada et al. | 360/113 |
| 5,313,356 | 5/1994 | Ohkubo et al. | 360/126 |
| 5,438,747 | 8/1995 | Krounbi et al. | 360/113 |
| 5,555,147 | 9/1996 | Maruyama | 360/113 |

FOREIGN PATENT DOCUMENTS

| 58-36406 | 8/1983 | Japan |

*Primary Examiner*—Craig A. Renner
*Attorney, Agent, or Firm*—Nikaido Marmelstein Murray & Oram LLP

[57] ABSTRACT

A composite thin film head comprises a magnetoresistive head portion and an inductive head portion which are superposed on a substrate, the inductive head portion comprising a lower core layer disposed on one side of a gap spacer layer and adjacent to the magnetoresistive head portion, and an upper core layer disposed on the other side of the gap spacer layer. The lower core layer comprises a core portion positioned toward the upper core layer having the same width as the upper core layer in the vicinity of a medium-opposed face, and a shield portion positioned toward the magnetoresistive head portion having a larger width than the core portion in the vicinity of the medium-opposed face.

6 Claims, 11 Drawing Sheets

COMPOSITE THIN FILM HEAD HAVING MAGNETORESISTIVE AND INDUCTIVE HEAD PORTIONS WITH NONMAGNETIC THIN FILM INTERPOSED BETWEEN CORE AND SHIELD PORTIONS OF CORE LAYER

This application is a continuation of application Ser. No. 08/380.995 filed Jan. 31, 1995, now abandoned.

FIELD OF THE INVENTION

The present invention relates to composite thin film heads for use in a magnetic recording-reproduction apparatus such as a hard disc drive apparatus.

BACKGROUND OF THE INVENTION

Composite thin film heads each comprise an inductive head portion and a magnetoresistive head portion integral therewith. For example, FIG. 12 shows the construction of the portion of such a composite thin film head to be opposed to recording media. Formed on a substrate 1 in superposed layers are a lower protective layer 2, lower shield layer 3, gap spacer layer 4, magnetoresistive (MR) element layer 5, conductor layers 6, 6 for energizing the MR element layer and gap spacer layer 7 to provide an MR head portion. An inductive head portion, which is formed on the MR head portion, comprises superposed layers, i.e., a lower core layer 84, gap spacer layer 9, upper core layer 10 and upper protective layer 11.

As disclosed in Examined Japanese Patent Publication SHO 58-36406, composite thin film heads generally have an upper shield layer between the gap spacer layer 7 of the MR head portion and the lower core layer 84 of the inductive head portion to provide a magnetic shield between these head portions, whereas the upper shield layer can be dispensed with as seen in FIG. 12 by rendering a lower layer portion of the lower core layer 84 serviceable as the upper shield layer.

With the composite thin film head of FIG. 12, the face of upper core layer 10 of the inductive head portion to the be opposed to recording media has a width W, which defines the width of the recording track to be formed on the recording medium. However, the lower core layer 84 is in the form of a flat plate and also serves as the upper shield layer as stated above extending toward opposite sides beyond the width W of the upper core layer 10, so that if the recording current increases, leakage flux from the gap spacer layer 9 also spreads toward the opposite sides of the width W within the lower core layer 84, giving the recording track an effective width greater than the width W of the upper core layer 10.

Such an increase in the effective width of the recording track produces a so-called "fringing area" on the recording medium. Especially in realizing a high track density in excess of 5000 TPI with a hard disc apparatus, the fringing area causes cross talk between adajcent tracks, placing a great obstacle to efforts to increase the track density.

Further, when the composite thin film head of FIG. 12 records signals, many magnetic domains with the direction of magnetization shown by arrows in FIG. 13 are formed on the upper core layer 10, and triangular closure magnetic domains 89 surrounded by domain walls 88 inclined with respect to the face 87 to be opposed to the medium occur in the vicinity of the face 87. If the width W of the medium-opposed face of the upper core layer 10 is decreased to increase the density of magnetic recording, the area occupied by the region of the closure magnetic domains 89 in the vicinity of the medium-opposed face increases relative to the area occupied by the remaining magnetic domains, which are parallel to the medium-opposed face in magnetization direction to entail the problem of impaired recording ability.

SUMMARY OF THE INVENTION

An object of the present invention is to provide a composite thin film head wherein the width W of its upper core layer accurately defines an effective recording track width on the recording medium.

Another object of the invention is to provide a composite thin film head wherein triangular closure magnetic domains are inhibited in the vicinity of its medium-opposed face.

The present invention provides a composite thin film magnetic head comprising a magnetoresistive head portion and an inductive head portion which are superposed on a substrate. The inductive head portion comprises a lower core layer disposed on one side of a gap spacer layer and adjacent to the magnetoresistive head portion, and an upper core layer disposed on the other side of the gap spacer layer, the upper core layer having a width in conformity with a track width on a recording medium at least in the vicinity of a medium-opposed face positionable as opposed to the recording medium. The lower core layer comprises a core portion positioned toward the upper core layer and having the same width as the upper core layer in at least the vicinity of the medium-opposed face, and a shield portion positioned toward the magnetoresistive head portion and having a larger width than the core portion in at least in the vicinity of the medium-opposed face.

According to an embodiment, the core portion and the shield portion of the lower core layer are the form of an integral magnetic thin film.

According to another embodiment, at least an upper layer, toward the gap spacer layer, of the core portion of the lower core layer is formed from a magnetic material of higher saturation magnetic flux density than the remaining portion of the lower core layer.

Further according to another embodiment, a nonmagnetic thin film is interposed between the shield portion and the core portion of the lower core layer. The nonmagnetic thin film is so interposed at least in the vicinity of the medium-opposed face, or in a region defined as being that except the vicinity, or in the entire region.

With the composite thin film head of the present invention, the shield portion of the lower core layer has a sufficient width and therefore effectively shields the magnetoresistive head portion and the inductive head portion from each other. Since the core portion of the lower core layer has the same width as the upper core layer which defines the track width, it is difficult for leakage flux from the gap spacer layer to spread toward opposite sides of the core portion, with the result that the effective recording track width matches the width of the upper core layer.

When at least the upper layer of the core portion of the lower core layer is formed from a magnetic material of high saturation magnetic flux density, the material suppresses magnetic saturation of the core portion, preventing leakage flux from the gap spacer layer from spreading toward the opposite sides of the core portion more effectively.

Further with the composite thin film head of the present invention, the core portion and the shield portion of the lower core layer are magnetostatically coupled to each other in the vicinity of the medium-opposed face to inhibit closure domains in the core portion.

In the case where the composite thin film head of the invention has the nonmagnetic thin film interposed between the shield portion of the lower core layer and the core portion thereof, the core portion and the shield portion are magnetostatically coupled, to each other beyond the nonmagnetic thin film to effectively inhibit closure domains in the core portion.

DETAILED DESCRIPTION OF EMBODIMENTS

Figure 1:
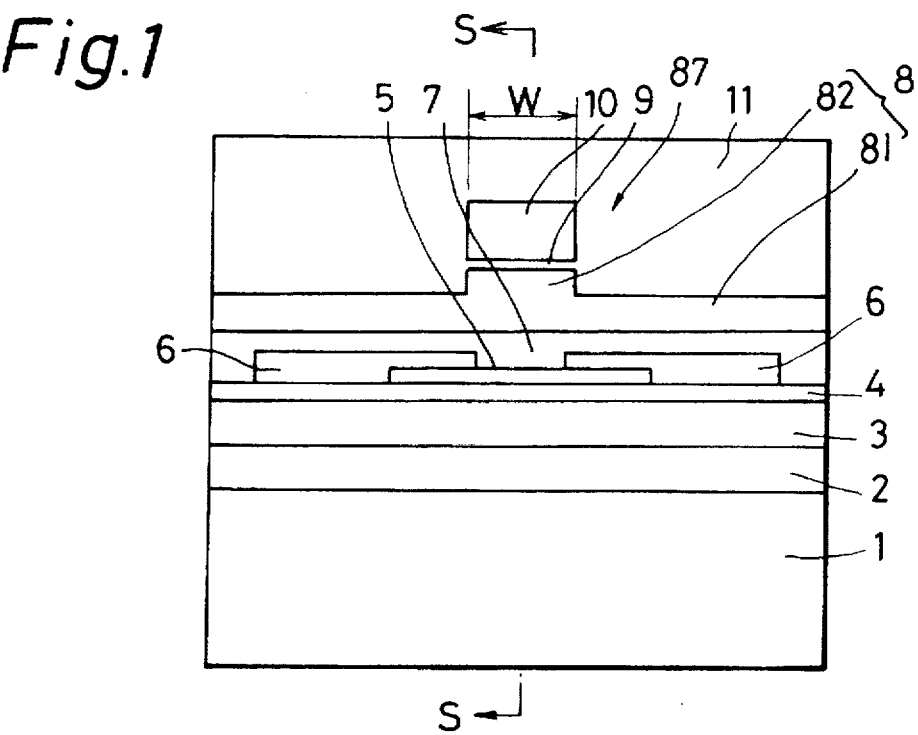
FIG. 1 is a front view of a composite thin film head embodying the invention.
Figure 2:
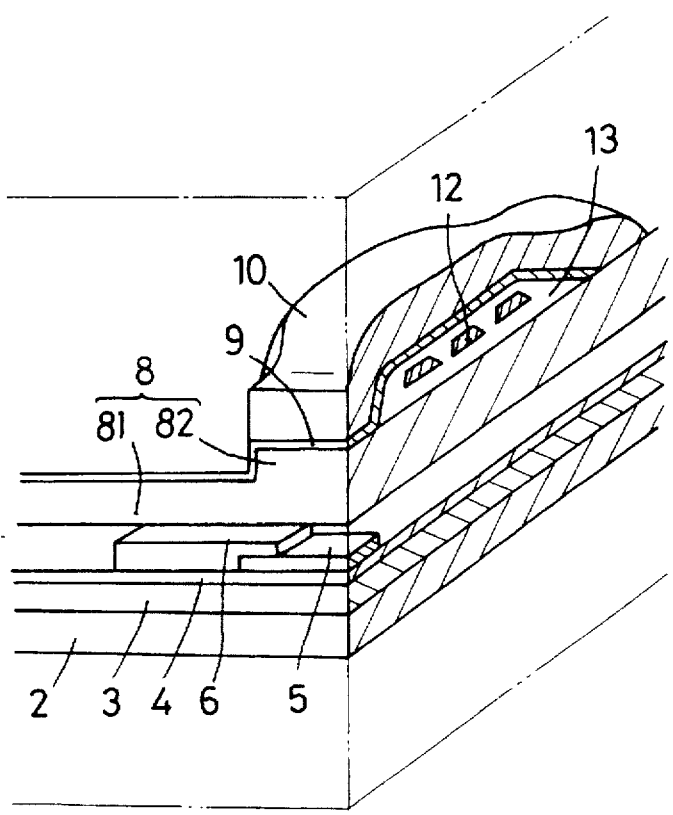
FIG. 2 is a perspective view showing the head of FIG. 1 as partly broken away along the line S—S in FIG. 1.

FIGS. 1 and 2 show a composite thin film head of the invention which comprises an MR head portion, and an inductive head portion formed on the MR head portion. The MR head portion comprises a lower protective layer 2 of $Al_2O_3$, lower shield layer 3 of FeAlSi or NiFe, gap spacer layer 4 of $Al_2O_3$, MR element layer 5 of NiFe, conductor layers 6, 6 of Au or W and gap spacer layer 7 of $Al_2O_3$ which are superposed in layers on an $Al_2O_3$-TiC substrate 1. The inductive head portion comprises superposed layers, ie., a lower core layer 8 of CoZr, NiFe or the like, gap spacer layer 9 of $Al_2O_3$, upper core layer 10 of CoZr, NiFe or the like and upper protective layer 11 of $Al_2O_3$. A Cu coil layer 12 is provided on the surface of the lower core layer 8 with an $Al_2O_3$ insulating layer 13 interposed therebetween as seen in FIG. 2.

In the vicinity of the face 87 to be opposed to recording media, the upper core layer 10 has a specified width W in conformity with a track width on the recording medium. The lower core layer 8 comprises a shield portion 81 having a large width and positioned toward the MR head portion, and a core portion 82 having a small width and positioned toward the upper core layer 10. In the vicintiy of the medium-opposed face 87, the core portion 82 has the same width as the upper core layer 10.

With the composite thin film head described, the lower core layer 8 shaped to project upward by the core portion 82 of small width formed on the shield portion 81 of large width makes it difficult for leakage flux from the cap spacer layer 9 to spread toward opposite sides of the core portion 82, consequently preventing an increase in effective recording track width to realize a magnetic recording-reproduction apparatus of high track density Not only the core portion 82 of the lower core layer 8 but also the shield portion 81 thereof functions as a magnetic core. This inhibits magnetic saturation of the lower core layer 8.

Figure 3A:
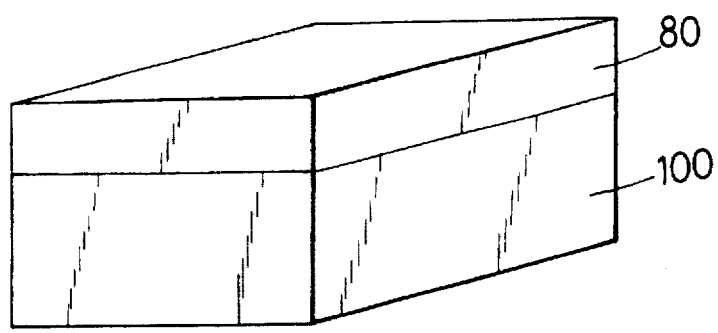
FIGS. 3(a), 3(b) and 3(c) are a series of diagrams showing a process for forming a lower core layer.
Figure 3B:
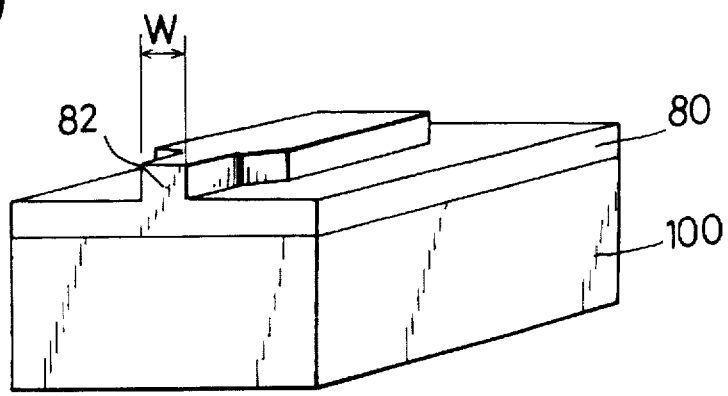
Figure 3C:
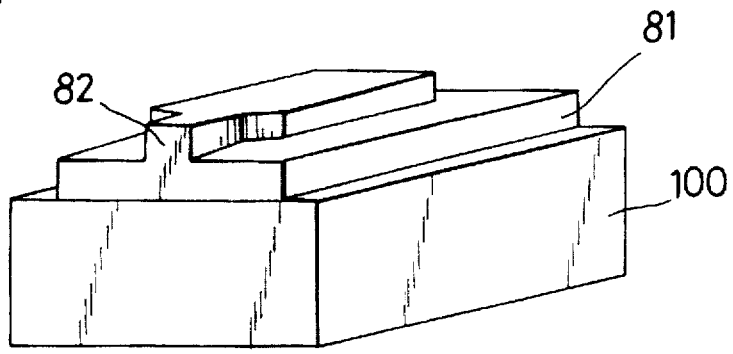

FIGS. 3(a), 3(b) and 3(c) show a process for forming the lower core layer 8.

As shown in FIG. 3(a), a magnetic thin film 80 of CoZr, NiFe or the like is formed to a thickness of several to 10 μm over the entire surface of a block 100 comprising an MR head portion formed on a substrate. Next as shown in FIG. 3(b), the magnetic thin film 80 is etched to a depth of 3 to 7 μm using a resist pattern approximately in conformity with the shape of the upper core layer to be formed by the subsequent process when seen from above, whereby a core portion 82 is formed. As shown in FIG. 3(c), the magnetic thin film 80 is thereafter etched at its peripheral portion until this portion disappears using a resist pattern shaped to extend beyond the entire upper core layer widthwise thereof when seen from above, whereby a shield portion 81 is formed.

Figure 4:
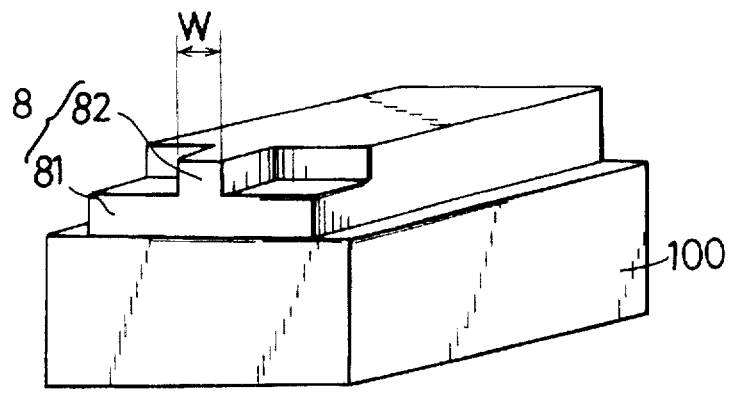
FIG. 4 is a perspective view showing a lower core layer of different shape.

The core portion 82 of the lower core layer 8 need not always be approximately identical, in its entirety, with the upper core layer in shape, but may have generally the same shape as the upper core layer in plan view only in the vicinity of the medium-opposed face as shown in FIG. 4.

Figure 5A:
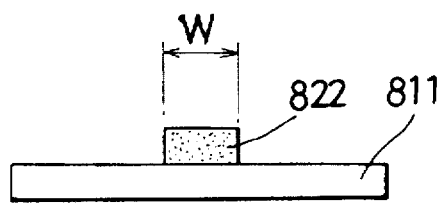
FIGS. 5(a), 5(b) and 5(c) are front views showing examples of lower core layers each having an upper layer portion which is formed from a material of high saturation magnetic flux density.
Figure 5B:
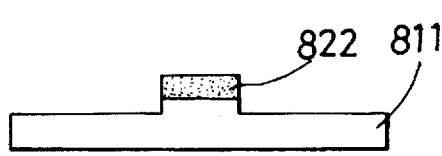
Figure 5C:
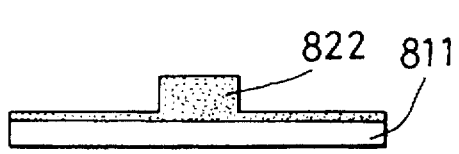

The lower core layer 8 need not always be formed from a single magnetic material in its entirety. As shown in FIGS. 5(a), 5(b) and 5(c), the lower core layer 8 is divided into a lower layer portion 811 and an upper layer portion 822 which ace made of different magnetic materials.

The division into the lower layer portion 811 and the upper layer portion 822 mentioned means division as to the material, and is not in match with the division into the shield portion 81 and the core portion 82 relating to the configuration. With the example shown in FIG. 5(a), the entire core portion 82 corresponds to the upper layer portion 822, and the entire shield portion 81 to the lower layer portion 811, whereas with the example of FIG. 5(b), the lower layer portion 811 includes a lower part of the core portion 82. Further in the case of the example of FIG. 5(c), the upper layer portion 822 includes an upper part of the shield portion 81. These structures are available by suitably determining the relationship between the thickness of each of the lower and upper layer portions 811 and 822 and the etching depth involved in the step of forming the core portion shown in FIG. 3(b).

The lower layer portion 811 is made typically of an Ni—Fe alloy thin film. The upper layer portion 822 is made typically of a Co—Zr—Sn alloy thin film, Fe—Zr—N alloy thin film or Fe—Ta—C alloy thin film which has a higher saturation magnetic flux density and greater uniaxial anisotropy than the Ni—Fe alloy thin film.

Magnetic thin films of high saturation magnetic flux density inhibit magnetic saturation, and those of great uniaxial anisotropy inhibit closure domains, so that the upper layer portion 822 of core portion 82 of the lower core layer 8, when made of the above-mentioned material, makes it difficult for leakage flux from the gap spacer layer 9 to spread widthwise of the recording track.

An experiment was conducted to substantiate the fringing area inhibiting effect of the present invention, with the result to be described below. For the experiment, three different composite thin film heads were prepared which had the structural features given in Table 1 below. The head samples were checked for the relationship between the recording current and the fringing area.

Figure 13:
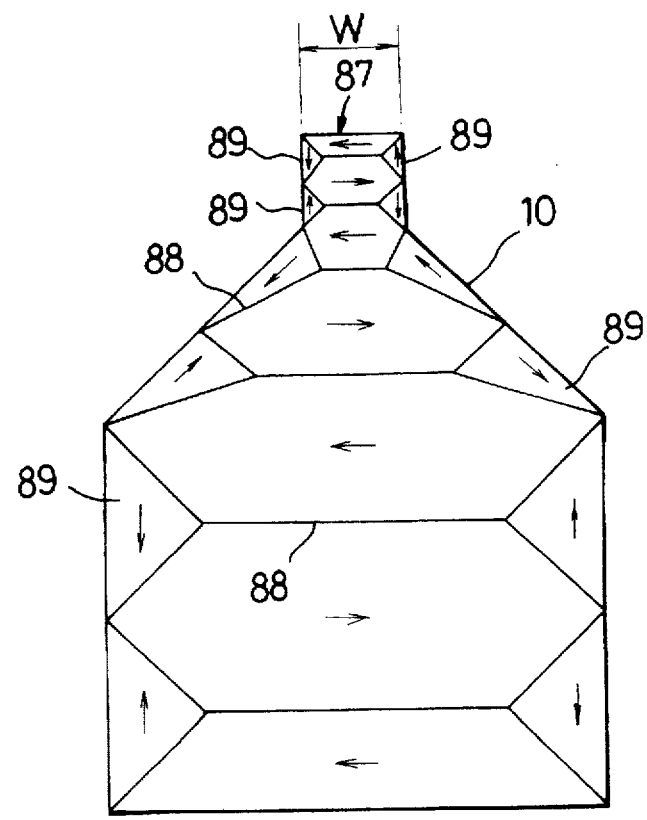
FIG. 13 is a diagram showing the domain structure of an upper core layer of the conventional composite thin film head.
Figure 14:
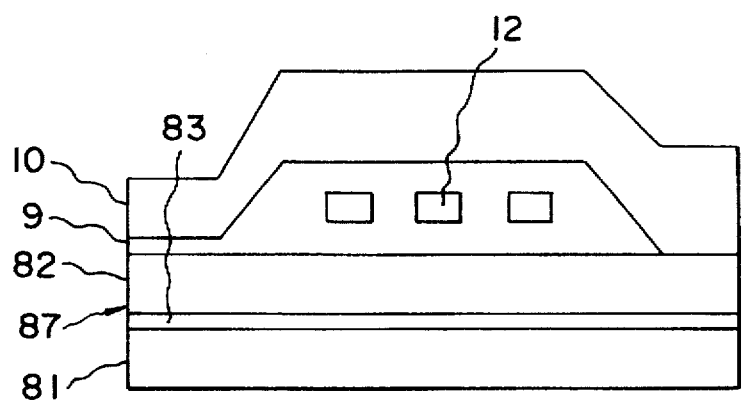
FIG. 14 is another view of a composite thin film head.

With reference to Table 1, the invention example A had a lower core layer 8 of double-layer structure as shown in FIG. 5(a), the invention example B had a lower core layer 8 of single-layer structure, and the conventional example had the lower core layer 84 in the form of a flat plate as shown in FIG. 13.

TABLE 1

|  | Lower core layer | Upper core layer | |
| --- | --- | --- | --- |
|  | Material | Material | Width (μm) |
| Invention example A | Upper layer portion of Co-Zr-Sn Lower layer portion of Ni-Fe | Co-Zr-Sn | 4.5 |
| Invention example B | Single Ni-Fe layer | Ni-Fe | 4.5 |
| Conventional example | Single Ni-Fe layer | Ni-Fe | 4.5 |

Figure 6:
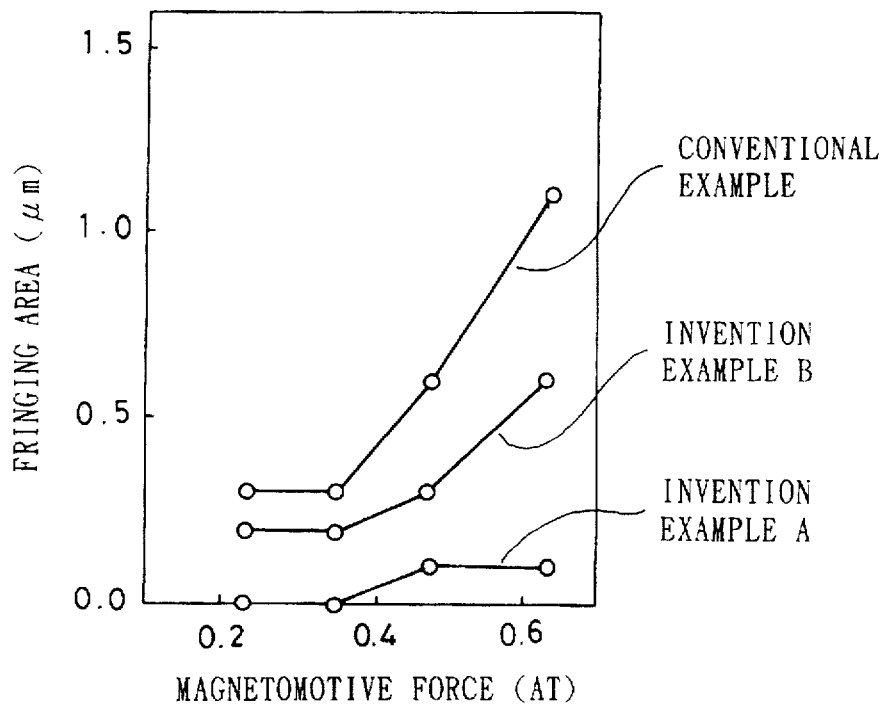
FIG. 6 is a graph showing the fringing area inhibiting effect of the invention.

FIG. 6 shows the relationship between the magnetomotive force (AT) and the fringing area (μm) established by the experiment for each of the head samples. Expressed by the magnetomotive force (AT) is the product of the recording current (A) passed through the coil layer of the inductive head portion multiplied by the number of turns (T) of the coil layer. Each of the head samples were checked for the fringing area by recording signals on a magnetic disc of 1670 Oe in magnetic resistance, reproducing the signals while moving the head pitch by pitch at an interval of 0.1 μm widthwise of the track to measure the reproduction output, speculating the amount of movement of the head for reducing the output to zero from the tendency of the output to attenuate with the movement of the head to take the speculated amount of movement as an effective recording track width Te and calculating the difference between the width Te and the width W of the upper core layer 10 of the head, i.e., Te—W, as a fringing area.

FIG. 6 reveals that the fringing area due to an increase in the recording current is inhibited in the case of the head of the invention example B wherein the lower core layer has an upward projection, and is more effectively inhibited in the case of the head of the invention example A wherein the lower core layer has an upward projection and an upper layer portion of Co—Zr—Sn, unlike the conventional head wherein the lower core layer is in the form of a flat plate.

Figure 7:
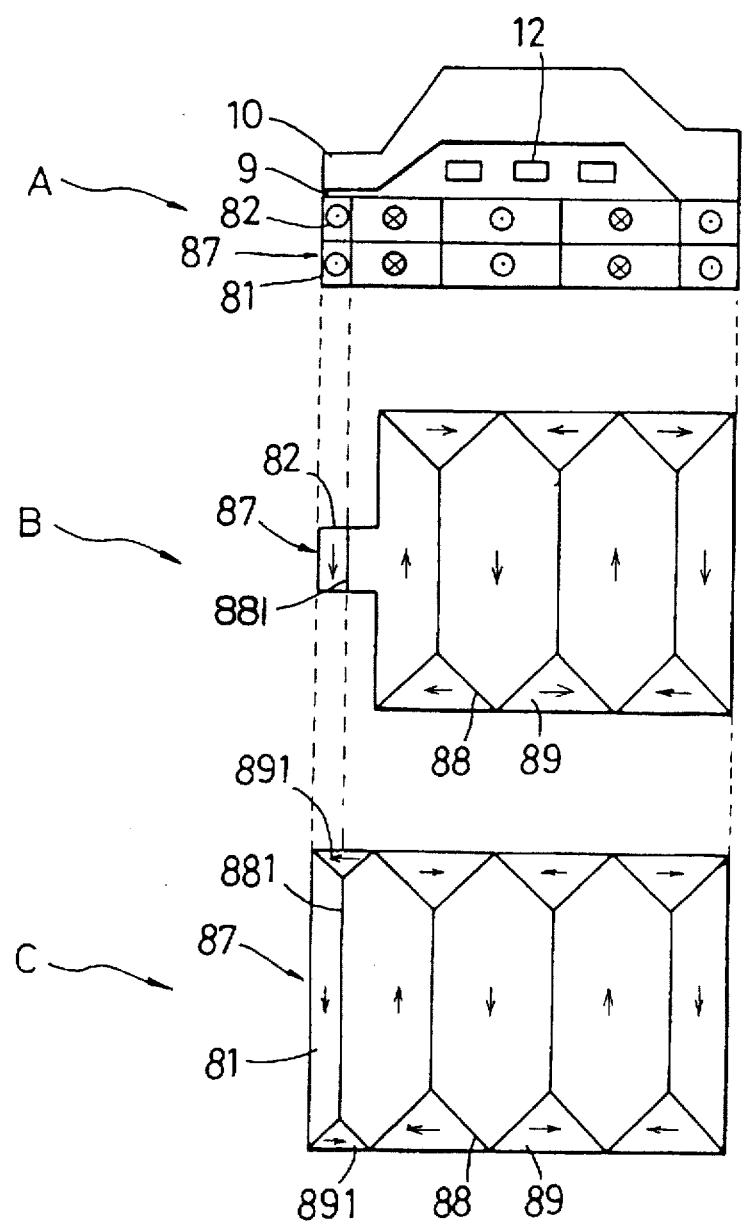
FIG. 7 is a diagram showing the relationship between domains appearing in different sections A, B and C of the composite thin film head.

FIG. 7 shows the state of domains appearing in different sections A, B and C owing to the energization of the coil layer 12 in the composite thin film head of the invention shown in FIGS. 1 and 2. The arrow in each domain shown represents the direction of magnetization. The position of domain walls 88 and the direction of magnetization are so determined that the entire domain structure will be stabilized with respect to energy.

In a vertical section A orthogonal to the medium-opposed face 87, the domain formed in the shield portion 81 of the lower core layer and the domain formed in the core portion 82 and positioned thereabove are identical in the direction of magnetization. In a horizontal section C of the shield portion 81, triangular closure domains 891, 891 occur at side portions opposed to each other widthwise of the track in the vicinity of the medium-opposed face 87, while the central portion with respect to the direction of width of the track has a 180° domain wall 881 parallel to the face 87 and a direction of magnetization which is parallel to the face 87. In a horizontal section B of the core portion 82, the portion in the vicinity of the medium-opposed face 87 is in direct contact with the domain of the shield portion 81 formed by the 180° domain wall to assume a ferromagnetic coupling and become identical with that domain in magnetization direction, forming a 180° domain wall 881 parallel to the face 87 with disappearance of the triangular closure domains. This gives increased effective magnetic permeability to the lower core layer 8 in the vicinity of the face 87 to improve the recording ability of the inductive head portion.

Figure 8:
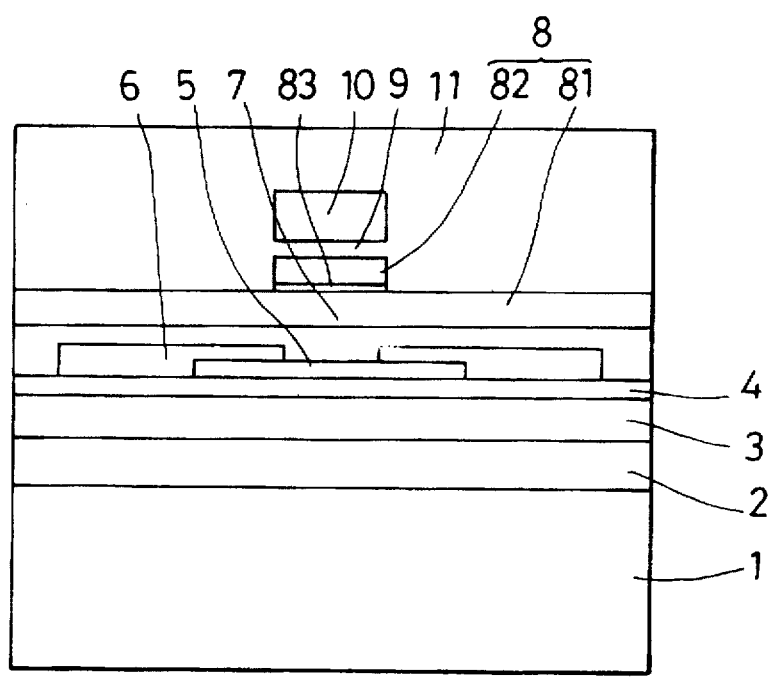
FIG. 8 is a front view of another composite thin film head embodying the invention.

FIG. 8 shows a composite thin film head which includes a nonmagnetic thin film 83 having a thickness of 10 to 200 μm, interposed between the shield portion 81 and the core portion 82 of the lower core layer 8 and extending only in the vicinity of the medium-opposed face 87 so as to prevent generation of closure domains more effectively. The nonmagnetic thin film 83 is formed, for example, from $Al_2O_3$, $SiO_2$, Ta or Ti.

Figure 9:
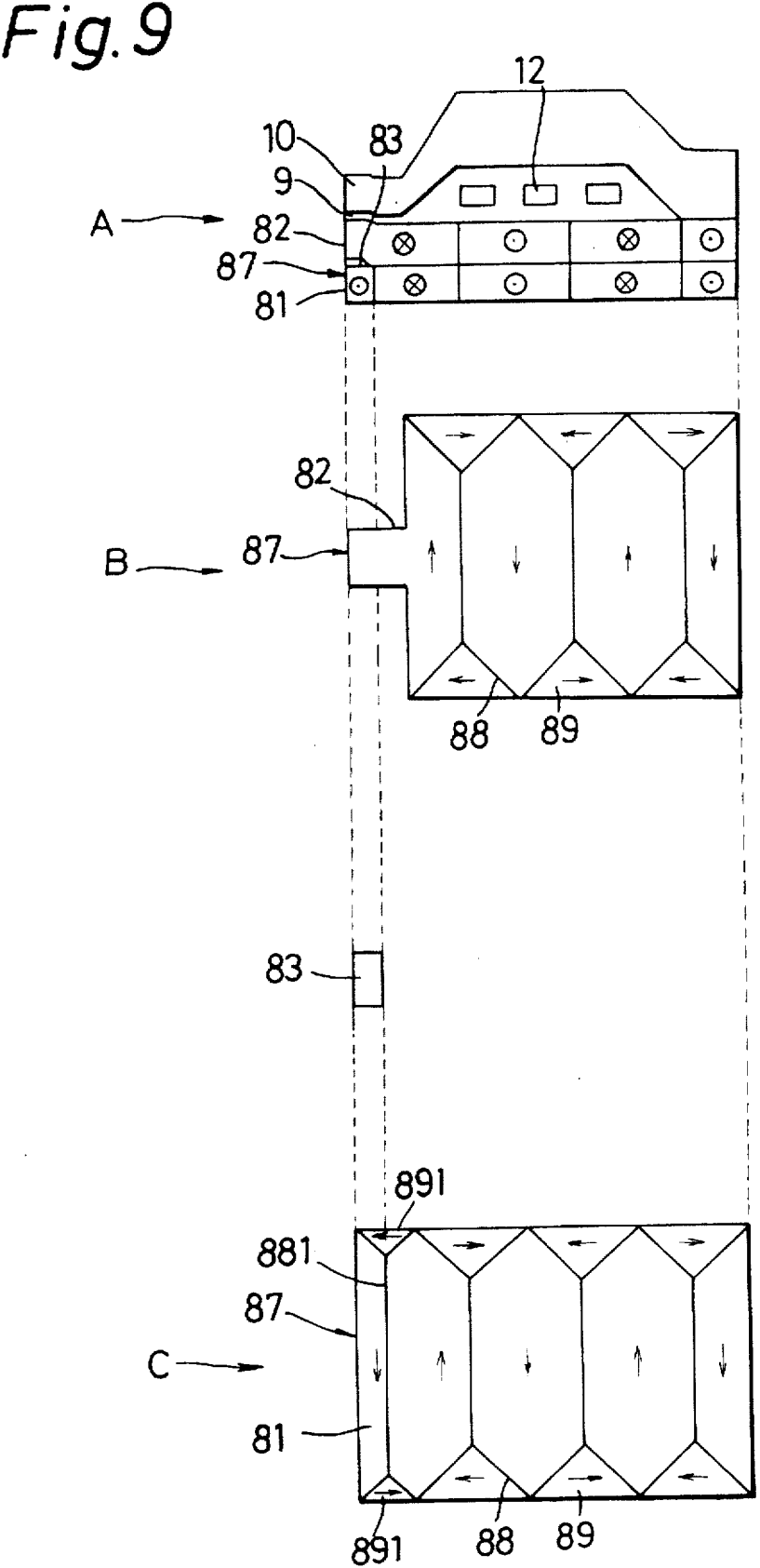
FIG. 9 is a diagram showing the relationship between domains appearing in different sections A, B and C of the head of FIG. 8.

FIG. 9 shows the state of domains occurring in different sections A, B and C of the composite thin film head.

In a vertical section A orthogonal to the medium-opposed face 87, the domain formed in the shield portion 81 and the domain formed in the core portion 82 and positioned thereabove are identical in the direction of magnetization, in the region where the nonmagnetic thin film 83 is not interposed. In a horizontal section C of the shield portion 81, triangular closure domains 891, 891 occur at side portions opposed to each other widthwise of the track in the vicinity of the medium-opposed face 87, while the central portion with respect to the direction of width of the track has a 180° domain wall 881 and magnetization direction parallel to the face 87. In a horizontal section B of the core portion 82, the portion in the vicinity of the medium-opposed face 87 forms a ferromagnetic coupling with the domain of the shield portion 81 formed by the 180° wall beyond the nonmagnetic thin film 83 interposed therebetween and becomes opposite to that domain in magnetization direction, with disappearance of the triangular closure domains.

Figure 10:
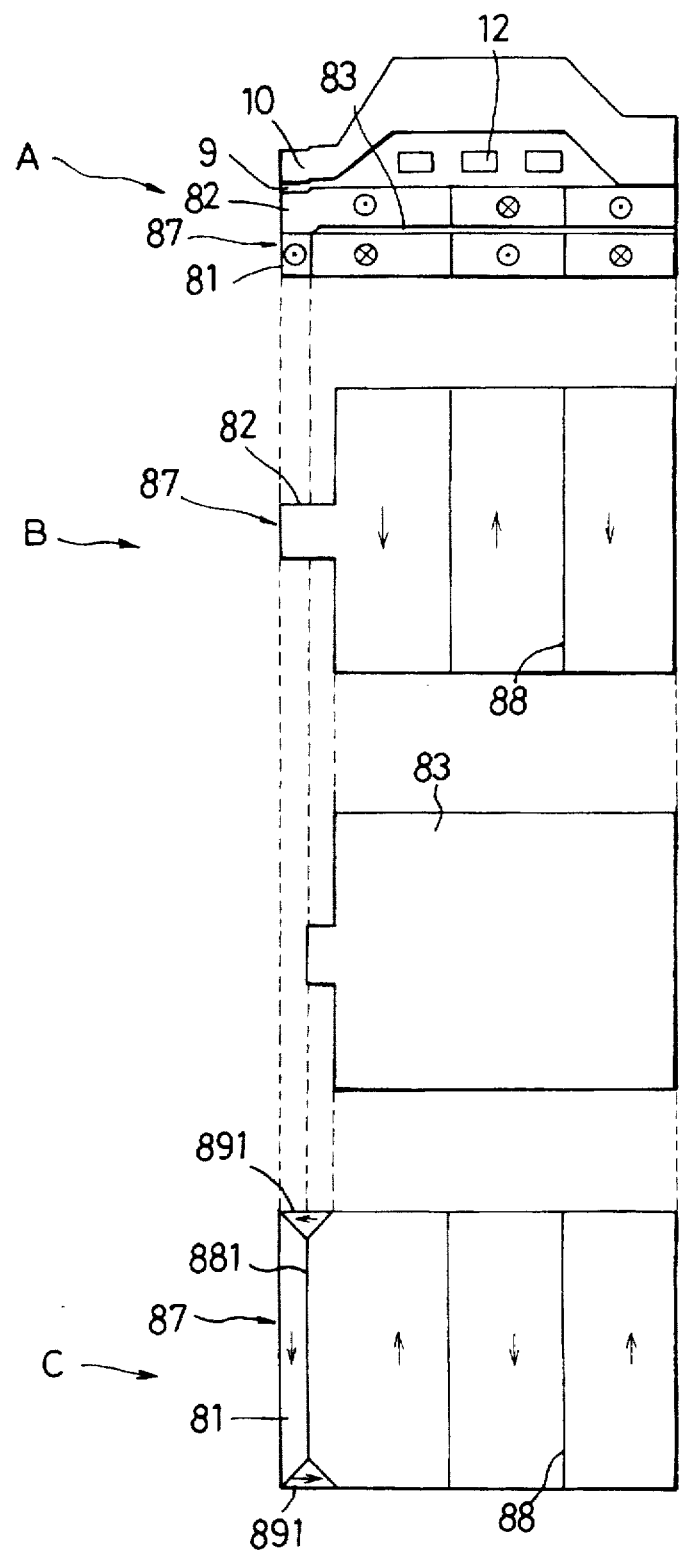
FIG. 10 is a diagram showing the relationship between domains appearing in different sections A, B and C of another embodiment.

On the other hand, FIG. 10 shows a composite thin film head which includes a nonmagnetic thin film 83 having a thickness of 10 to 200 nm, interposed between the shield portion 81 and the core portion 82 of the lower core layer 8 and extending over a region except the vicinity of the medium-opposed face 87.

In a vertical section A orthogonal to the face 87, the domain formed in the shield portion 81 and the domain formed in the core portion 82 and positioned thereabove form a ferromagnetic coupling and are opposite to each other in the direction of magnetization in the region where the nonmagnetic thin film 83 is present. In a horizontal section C of the shield portion 81, triangular closure domains 891, 891 occur at side portions opposite to each other widthwise of the track, in the vicinity of the medium-opposed face 87, while the central portion with respect to the direction of width of the track has a 180° domain wall and a magnetization direction parallel to the face 87. In a horizontal section B of the core portion 82, the vicinity of the face 87 forms a ferromagnetic couplings,with the domain of the shield portion 81 formed by the 180° domain wall and is identical with that domain in magnetization direction, with disappearance of the triangular domains.

Figure 11:
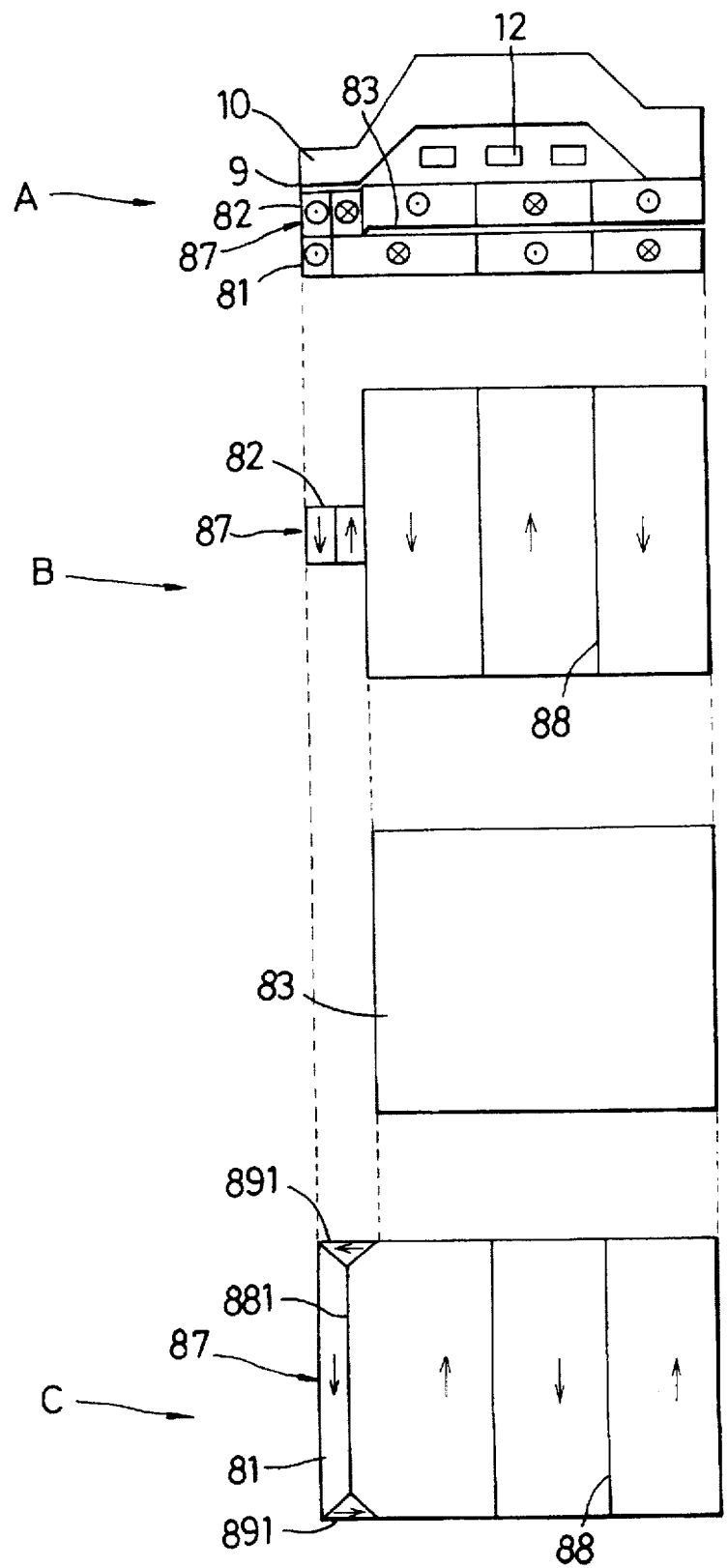
FIG. 11 is a diagram showing the relationship between domains appearing in different sections A, B and C of still another embodiment.
Figure 12:
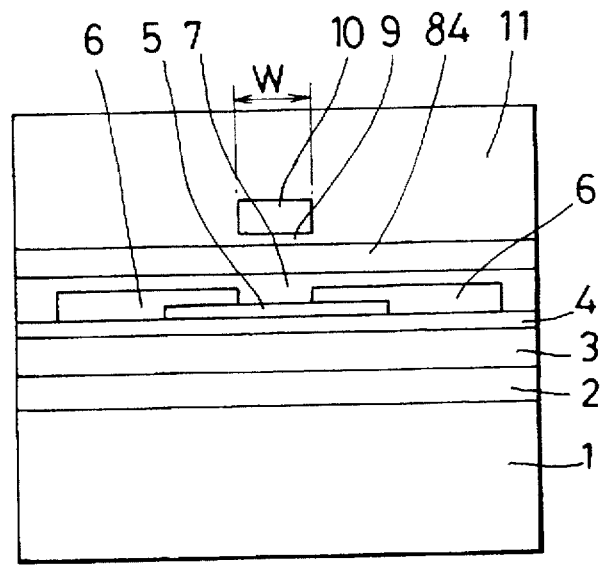
FIG. 12 is a front view of a conventional composite thin film head.

FIG. 11 shows another composite thin film head wherein the nonmagnetic thin film 83 interposed between the shield portion 81 and the core portion 82 of the lower core layer 8 is slightly retracted from the position of the film 83 in FIG. 10.

In a horizontal section B of the core portion 82 in this case, the portion in the vicinity of the medium-opposed face 87 forms a ferromagnetic coupling with two magnetic domains of the shield portion 81 formed by a 180° domain wall in the vicinity of the face 87, with the result that two domains opposite to each other in magnetization direction are formed in the vicinity of the face 87, with triangular closure domains eliminated.

In any of the composite thin film heads wherein the nonmagnetic thin film 83 is interposed between the shield portion 81 and the core portion 82 of the lower core layer 8, the triangular closure domains disappear in the vicinity of the medium-opposed face, with an increase in the area of domain wherein the direction of magnetization is parallel to the face, hence higher recording ability than in the prior art.

In the case of the composite thin film head wherein the nonmagnetic thin film 83 is interposed in the entice region between the shield portion 81 and the core portion 82 of the lower core layer 8, these portions 81, 82 are magnetically coupled to each other to inhibit closure domains in the vicinity of the medium-opposed face if the nonmagnetic thin film 83 is up to 1 µm in thickness.

The embodiments described above are intended to illustrate the present invention and should not be construed as limiting the invention as defined in the appended claims or reducing the scope thereof. Furthermore, the components of the present device are not limited to those of the embodiments in structure but can of course be modified variously without departing from the spirit of the invention as set forth in the claims.

What is claimed is:

1. A composite thin film head comprising a magnetoresistive head portion and an inductive head portion which are superposed on a substrate, the inductive head portion comprising a lower core layer disposed on one side of a gap spacer layer and adjacent to the magnetoresistive head portion, and an upper core layer disposed on the other side of the gap spacer layer, the upper core layer having a width in conformity with a track width on a recording medium at least in a vicinity of a medium-opposed face positioned opposite to the recording medium, the lower core layer comprising a core portion positioned toward the upper core layer, a shield portion positioned toward the magnetoresistive head portion and a nonmagnetic thin film interposed between the shield portion and the core portion, the shield portion of the lower core layer having a larger width than the core portion at least in the vicinity of the medium-opposed face, and the nonmagnetic thin film extending only in a partial region which is adjacent to the medium-opposed face and the shield portion and the core portion abut one another in a region spaced from the medium opposed face.

2. A composite thin film head as defined in claim 1 wherein the core portion of the lower core layer has the same width as the upper core layer at least in the vicinity of the medium-opposed face, and said partial region is a region having the same width as the core portion of the lower core layer in the vicinity of the medium-opposed face.

3. A composite thin film head as defined in claim 1 wherein the nonmagnetic thin film is 10 to 200 nm in thickness.

4. A composite thin film head comprising a magnetoresistive head portion and an inductive head portion which are superposed on a substrate, the inductive head portion comprising a lower core layer disposed on one side of a gap spacer layer and adjacent to the magnetoresistive head portion, and an upper core layer disposed on the other side of the gap spacer layer, the upper core layer having a width in conformity with a track width on a recording medium at least in a vicinity of a medium-opposed face positioned opposite to the recording medium, the lower core layer comprising a core portion positioned toward the upper core layer, a shield portion positioned toward the magnetoresistive head portion and a nonmagnetic thin film interposed between the shield portion and the core portion, the shield portion of the lower core layer having a larger width than the core portion at least in the vicinity of the medium-opposed face, and the nonmagnetic thin film extending only in a partial region which is spaced from the medium-opposed face and the shield portion and the core portion abut one another in a region adjacent to the medium opposed face.

5. A composite thin film head as defined in claim 4 wherein the core portion of the lower core layer has the same width as the upper core layer at least in the vicinity of the medium-opposed face.

6. A composite thin film head as defined in claims 4 wherein the nonmagnetic thin film is 10 to 200 nm in thickness.

* * * * *